March 15, 1960

E. LAXO 2,928,515

DRIVE MECHANISM

Filed Aug. 16, 1957

INVENTOR.
ED LAXO

BY

ATTORNEY

United States Patent Office 2,928,515
Patented Mar. 15, 1960

2,928,515

DRIVE MECHANISM

Ed Laxo, Oakland, Calif.

Application August 16, 1957, Serial No. 678,637

6 Claims. (Cl. 192—48)

This invention relates to a drive mechanism. More particularly this invention relates to a dual clutch mechanism which is capable of driving one or both of two shafts, and it has special application to the soldering element and the side seam forming element of a can body making machine.

In making tubular can bodies, can body blanks are slit and notched and are then folded along their edges to form hooks from which side seams are formed. The slit, notched and folded blanks are then supplied to a side seam forming element which interlocks the preformed hooks and hammers them to form side seams. The tubular bodies so formed are then supplied to a soldering element for application of solder to the side seams. In the soldering element the tubular can bodies are caused to pass between guide rails in contact with a rotating solder roll. The solder roll rotates in a bath of molten solder and applies solder to the side seams of the can bodies as they pass through. A continuously moving conveyor conveys each can body from the side seam forming element through the soldering element.

The side seam forming element and the soldering element of a can body maker must operate at high speed and in accurately timed relation. Also, it is necessary at times to stop the side seam forming element, for example, to make repairs or adjustments or to remove a jammed can body. If the stoppage is of short duration it is preferable that the soldering element continue operating. Otherwise, if the solder roll is allowed to come to rest, it may become fouled by the solder.

Heretofore it has been a common practice to provide two shafts, one of which operates the soldering element and will be referred to for convenience as the "soldering shaft." The other shaft operates the side seam forming element and will be referred to for convenience as the "side seamer" shaft. In such prior design the two shafts have been driven as follows: The "side seamer" shaft is operated by a first clutch and, when driven it also drives the "soldering shaft" through a gear train. The "soldering shaft" is also driven directly by a second clutch. The gear train employs an overrunning clutch which permits the "soldering shaft" to be driven directly by the second clutch without operating the "side seamer" shaft. This overrunning clutch also employs a timing feature which insures that both shafts, when driven together, operate in properly timed relation. By engaging the first clutch both shafts are driven together and by engaging the second clutch only the "soldering" shaft is driven.

As indicated, this prior drive mechanism requires a gear train to connect the two shafts. Such gear train is expensive, it requires a housing and other disadvantages result.

It is an object of the present invention to provide a novel and improved drive mechanism which is capable of driving one or both of two shafts.

It is a particular object of the invention to provide a drive mechanism whereby the side seam forming element and the soldering element of a can body maker can be operated in unison but, when desired, the soldering element can be operated without operating the side seam forming element, such mechanism having the advantages and performing the functions of prior mechanisms but having the advantage of eliminating the gear train connection between the shafts.

These and other objects of the invention will be apparent from the ensuing description and appended claims.

One form of the invention is shown by way of example in the accompanying drawings, in which.

Figure 1:
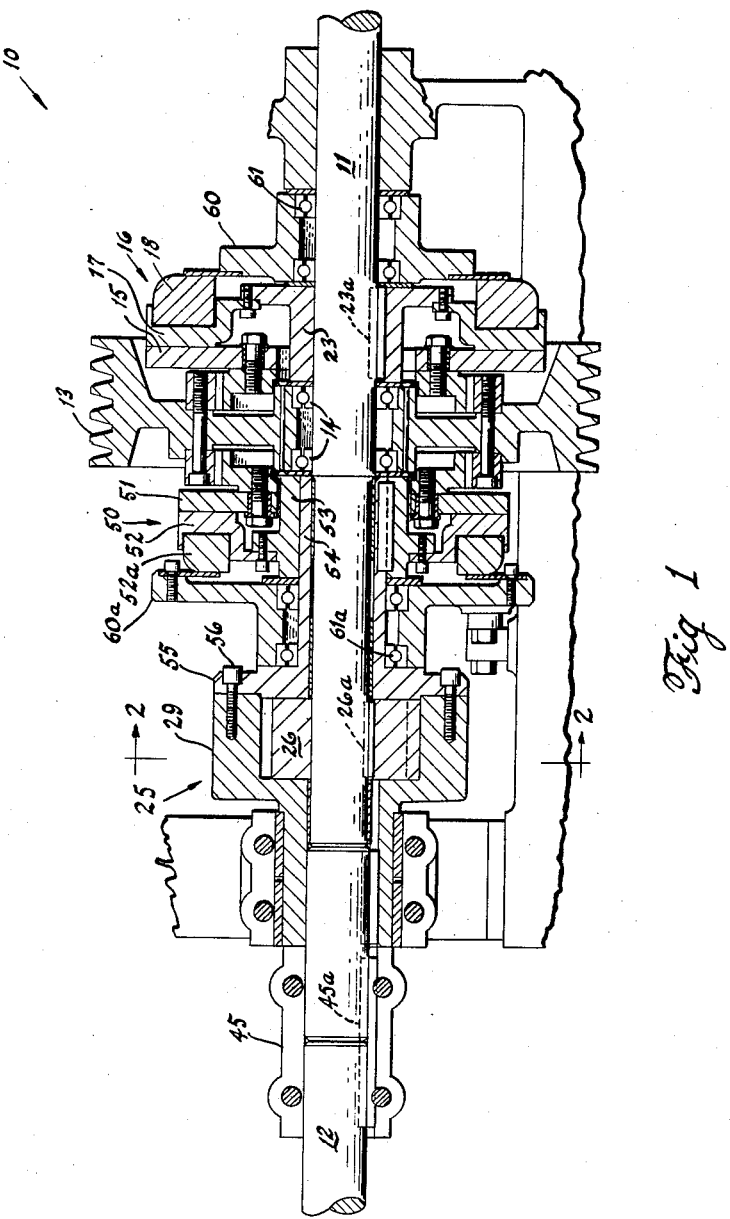
Figure 1 is a view in vertical section through the mechanism of the invention.

Referring now to the drawings and primarily to Figure 1, the mechanism of the invention is there shown and is generally indicated by the reference numeral 10. This mechanism is intended to operate a first shaft 11 and a second shaft 12 which are in axial alignment. That is to say, it is intended to connect the shafts 11 and 12 with a source of power for the purpose of driving the two shafts together in properly timed relation, or to operate the shaft 12 alone without operating the shaft 11.

More particularly the shaft 11 will be connected to the side seam forming element of a can body making machine through suitable gearing (not shown) and the shaft 12 will be connected to the soldering element of the same can body making machine, also through suitable gearing (not shown). It is intended that the clutch mechanism 10 operate the shaft 12 continuously and at all times and that it operate the shaft 11 when desired. It is also intended that the shafts 11 and 12 operate in precisely timed relation. Thus shaft 11 must operate certain parts, such as the bumper steel of a side seamer, in timed relation to the operation of parts which are operated by the shaft 12, e.g., a can body conveyor. Therefore, when the shaft 11 is stopped while shaft 12 continues to operate, and the shaft 11 is started again, it should be started in timed relation to the shaft 12.

The clutch mechanism 10 includes a pulley 13 which is connected by belts and other suitable means (not shown) to a suitable prime mover, e.g., an electric motor (not shown). The pulley 13 is supported on bearings 14. As will be seen the pulley 13 is bolted to the driving element 15 of a magnetic clutch 16 which may be of any suitable type, several of which are well known. The driven element of the clutch 16 is shown at 17. The driving and driven elements 17 and 15 are engaged by means of an electro-magnetic element 18. When the electro-magnetic element 18 is energized the driving connection from the pulley 13 to the shaft 11 is established through the driving and driven elements 15 and 17 of clutch 16 and a hub 23 which is bolted to the driven element 17 and is keyed at 23a to the shaft 11. Therefore, it will be apparent that when the magnetic clutch 16 is engaged the pulley 13 will drive the shaft 11.

It is desired that, as long as the shaft 11 is driven, the shaft 12 shall also be driven. To this end a driving connection between the shafts 11 and 12 is provided which is generally designated by the reference numeral 25. This connection is shown in longitudinal section in Figure 1 and in transverse section in Figure 2. The driving connection 25, as will appear more fully hereinafter, is an overrunning clutch which requires that shaft 12 rotate at all times when shaft 11 rotates, but which permits shaft 12 to rotate while shaft 11 is idle.

Figure 2:
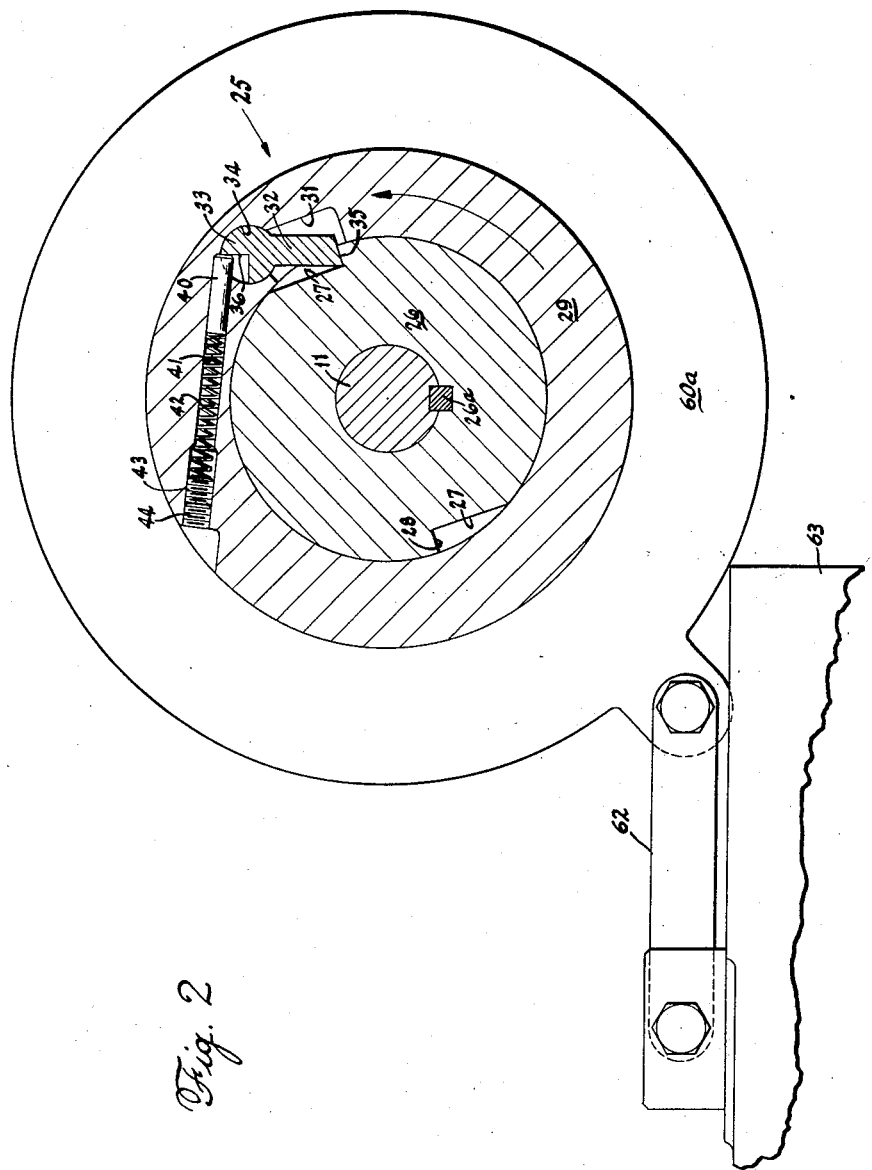
Figure 2 is a section taken along the line 2—2 of Figure 1.

The connection or clutch 25 comprises a hub or driving element 26 which is keyed at 26a to the extreme left-hand end (as viewed in Figure 1) of the shaft 11. Therefore the driving element 26 will rotate with the shaft 11. Referring now more particularly to Figure 2, it will be seen that the driving element 26 is formed with two notches 27 which are located 180° apart. Each of the notches 27 is formed with a radial shoulder 28. The driven element of the clutch 25 is a cylindrical member 29 which has a tubular extension or sleeve 30 which is keyed to a connector shaft 12a and, therefore, drives the same.

As will be seen from an inspection of Figure 2, the driven element 29 of the clutch 25 is formed on its inner surface with a recess 31 which is intended to receive a dog 32. The dog 32 has a cylindrical head portion 33 which is rotatable in a cylindrical portion 34 of the recess 31. As will be seen, one end of the dog 32 has a flat surface 35 which is intended to engage with the shoulder 28 of either notch 27. The other, cylindrical end 34 of the dog 32 is notched at 36 for engaging one end of a pin 40. The pin 40 is slidably received in a passageway 41 formed in the driven element 29 and it is pressed against the notch 36 by a spring 42. The spring 42 is compressed by a set screw 43 which is locked in place by a set screw 44.

It will be apparent from an inspection of Figures 1 and 2 that, as long as the shaft 11 is driven in counterclockwise direction (as viewed in Figure 2) by the pulley 13 through the magnetic clutch 15, the driven element 29 of the mechanical clutch 25 will be driven in the same direction and will, accordingly, drive the connector shaft 12a in counterclockwise direction and at the same angular velocity. A sleeve 45 is provided which is formed of two parts bolted together and it is keyed at 45a to both of the shafts 12a and 12. The purpose of the latter construction (i.e., the connector shaft 12a and the sleeve 45) is to permit easy access to and removal of the shaft 12 and other elements of the device.

It will, therefore, be apparent that as long as the pulley 13 drives the shaft 11, it will also drive the shaft 12 at the same speed and in the same direction.

For the purpose of driving the shaft 12 independently of the shaft 11, there is provided a second magnetic clutch which is to the left of the pulley 13 as viewed in Figure 1 and is generally designated by the reference numeral 50. The magnetic clutch 50 has a driving element 51 and a driven element 52 which are engaged when an electromagnetic element 52a is energized. The driven element 52 is bolted to a sleeve 53 which is keyed to an inner sleeve 54 which is formed at its left-hand end (as viewed in Figure 1) with a flange 55. The flange 55 is bolted at 56 to the driven element 29 of the mechanical clutch 25.

The circuit arrangement of the magnetic clutches 15 and 50 will be such that, when the magnetic clutch 15 is energized and engaged (therefore driving shafts 11 and 12 in the manner described above), the clutch 50 is de-energized and disengaged. The circuit arrangement is also such that, when the magnetic clutch 50 is energized the magnetic clutch 15 is de-energized, and is therefore disengaged. Referring to Figure 2, it will be apparent that, when the driven member 29 of the mechanical clutch 25 is driven by the magnetic clutch 50, it will overrun the driving element 26. Accordingly, under these conditions (i.e., engagement of the magnetic clutch 50 and disengagement of the magnetic clutch 15) the shaft 12 will be driven and the shaft 11 will remain stationary.

It will be apparent that the circuitry of the magnetic clutches 15 and 50 may be such that they can be operated independently. Thus each may have an off-and-on switch which may be operated manually.

It will further be apparent that, after a period during which the shaft 11 has been idle and the shaft 12 has been rotating, when the magnetic clutch 50 is again de-energized and the magnetic clutch 15 is energized, the shaft 11 will start rotating in precisely timed relationship to the shaft 12. Thus, referring to Figure 2, the shafts 11 and 12 can engage in only two positions corresponding to the two notches 27 and the dog 32. Since the notches 27 are 180° apart, the angular relation of the two shafts 11 and 12, while they are rotating together, must be either of two positions which are 180° apart. Therefore parts operated by the shaft 11 will operate in timed relation to parts operated by shaft 12.

The two electromagnetic elements 18 and 52a (both of which are shown in Figure 1) are mounted and held against rotation as follows: The element 18 is carried and restrained by a flange and hub 60 mounted on the shaft 11 by bearings 61. The element 52a is similarly held and restrained by a flange and hub 60a which is mounted on shaft 11 by bearings 61a. Referring to Figure 2, the restraining flange and hub 60a which supports the electromagnetic element 52a is connected by a link 62 to a stationary frame 63. The flange and hub 60 which support and restrain the electromagnetic element 18 is similarly provided with a link (not shown).

It will, therefore, be apparent that a mechanism has been provided which is capable of driving, or of transmitting a drive, to one or both of two shafts, such mechanism being also capable of maintaining timed relation between the shafts and avoiding the need for a gear train between the shafts.

I claim:

1. A drive mechanism of the character described comprising first and second coaxial shafts, a common drive, first and second clutches each having a driving element driven by said common drive, said first clutch having a driven element connected to said first shaft, an overrunning clutch coaxial to said shafts and having a driving element connected to and driven by said first shaft and a driven element connected to and driving said second shaft, the driving and driven elements of said overrunning clutch having an overrunning relation whereby the driving element will drive the driven element thereof but the latter will overrun the driving element thereof; the driven element of said second clutch being connected to the driven element of said overrunning clutch.

2. A mechanism of the character described comprising a frame and first and second shafts journaled in said frame in axial alignment, an overrunning clutch interconnecting said shafts, said overrunning clutch having a driving element connected to and rotating with said first shaft and a driven element connected to and rotating with said second shaft; means interconnecting said driving element with said driven element to cause the driving element, when rotated in a pretermined direction, to drive the driven element, said interconnecting means being such that, when the driving element is idle and the driven element is operated by other means, it will overrun the driving element; first and second main clutches, each having a driving element, a driven element, and means establishing a driving connection therebetween to cause each driving element to drive its driven element; and means connecting the driven element of said first main clutch to said first shaft to drive the latter when the first clutch is engaged and means connecting the driven element of the second main clutch to the driven element of said overrunning clutch to drive the latter when the second clutch is engaged.

3. A mechanism of the character described comprising a frame and first and second shafts journaled in said frame in axial alignment, an overrunning clutch interconnecting said shafts, said overrunning clutch having a driving element connected to and rotating with said first shaft and a driven element connected to and rotating with said second shaft; means interconnecting said driving element with said driven element to cause the driving element, when rotated in a predetermined direction, to drive the driven element, said interconnecting means being such that, when the driving element is idle and the driven element is operated by other means, it will overrun the driving element; first and second main clutches each having a driving element, a driven element, and means establishing a driving connection therebetween to cause each driving element to drive its driven element; and means connecting the driven element of said first main clutch to said first shaft to drive the latter when the first clutch is engaged and means connecting the driven element of the second main clutch to the driven element of said overrunning clutch to drive the latter when the second clutch is engaged.

4. A mechanism of the character described comprising a frame and first and second shafts journaled in said frame in axial alignment, an overrunning clutch interconnecting said shafts, said overrunning clutch having a driving element connected to and rotating with said first shaft and a driven element connected to and rotating with said second shaft; means interconnecting said driven element with said driving element to cause the driving element, when rotated in a predetermined direction, to engage the driven element in only certain predetermined angular relations, and, when so engaged, to drive the driven element, said interconnecting means being such that, when the driving element is idle and the driven element is operated by other means, it will overrun the driving element; first and second main clutches each having a driving element, a driven element, and means establishing a driving connection therebetween to cause each driving element to drive its driven element; and means connecting the driven element of said first main clutch to said first shaft to drive the latter when the first clutch is engaged and means connecting the driven element of the second main clutch to the driven element of said overrunning clutch to drive the latter when the second clutch is engaged.

5. A clutch and drive mechanism of the character described comprising a frame, first and second axially aligned shafts journaled in said frame, a common drive member for said shafts, a first clutch and a second clutch each having a driving member connected to and driven by said common drive member, said first clutch having a driven member connected to and serving to drive said first shaft when the first clutch is engaged, said second clutch also having a driven member; said mechanism also comprising an overrunning clutch including a driving member connected to said first shaft to rotate therewith when said first clutch is engaged and having also a driven member and means interconnecting said driving and driven members whereby the driving member will engage the driven member in only certain selected angular relations when rotated in a predetermined direction and will rotate said driven member when engaged, such interconnecting means permitting the driven member to overrun the driving member when the latter is idle and the formed is driven by other means; and means connecting the driven member of said second clutch to the driven member of said overrunning clutch to drive the latter when the second clutch is engaged.

6. A clutch and drive mechanism of the character described comprising a frame, first and second axially aligned shafts journaled in said frame, a common drive member for both of said shafts, first and second magnetic clutches each having a driving element and a driven element; means connecting the driving element of each magnetic clutch to said common drive whereby both are driven by such drive; magnetic means for engaging either driving element with its respective driven element, such magnetic means being operable to engage either of the magnetic clutches while maintaining the other of such clutches disengaged; means connecting the driven element of the first magnetic clutch to said first shaft to drive the latter when the first magnetic clutch is engaged; an overrunning clutch having a driving element connected to said first shaft to rotate therewith, a driven element, an overrunning type connecting means operatively connecting said driving element with its driven element to cause the two elements to engage in only selective relative angular positions when the first shaft is operating and to permit the driven element to operate when the driving element is idle; and means connecting the driven element of said overrunning clutch with said second shaft to drive the latter and means connecting such driven element with the driven element of said second magnetic clutch to drive said second shaft when the second magnetic clutch is engaged.

References Cited in the file of this patent

UNITED STATES PATENTS

| 1,413,058 | Richardson | Apr. 18, 1922 |
| 2,573,152 | Leifer | Oct. 30, 1951 |

FOREIGN PATENTS

| 405,376 | Italy | Aug. 9, 1943 |